(No Model.)
H. BREER.
APPARATUS FOR DESICCATING FERTILIZERS.
No. 303,914. Patented Aug. 19, 1884.
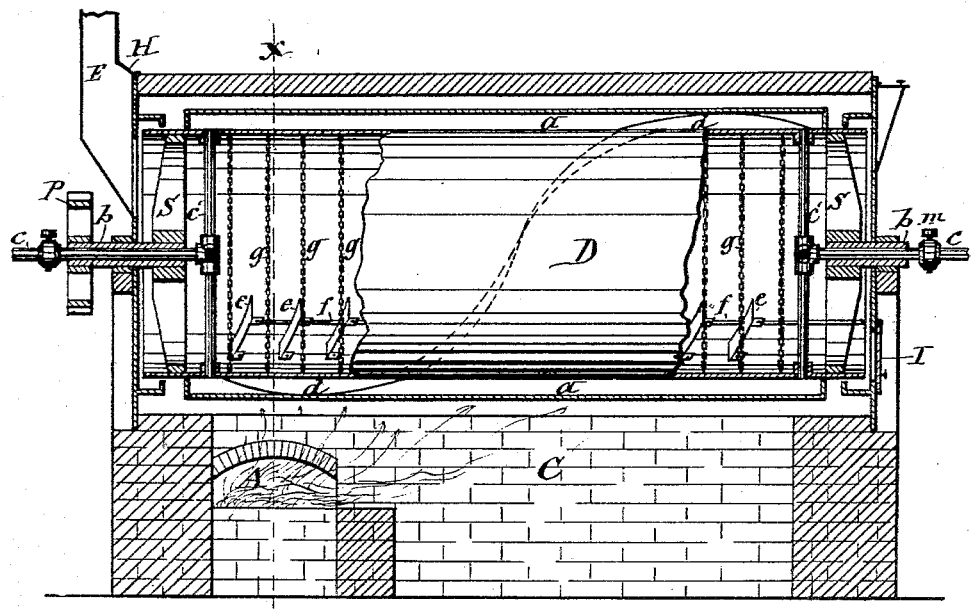
FIG-I-
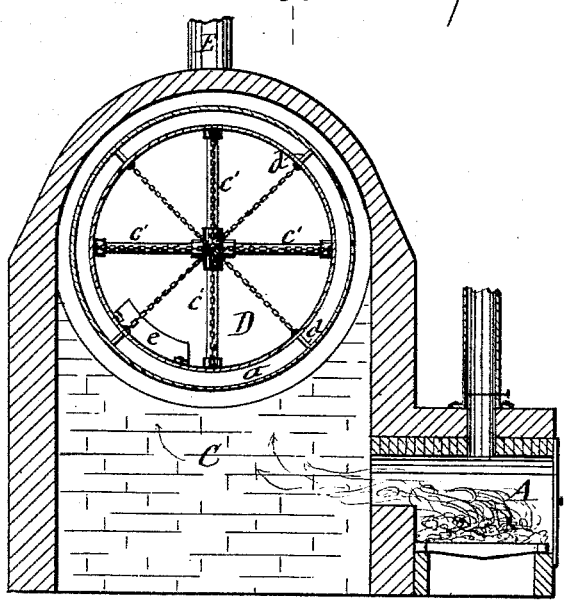
FIG-II-
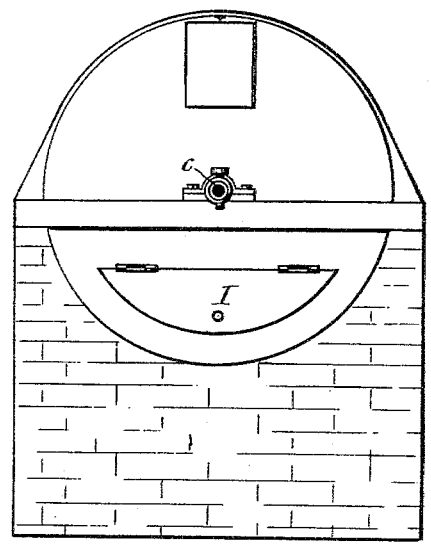
FIG-III-
WITNESSES
C. Bendixon
Wm. C. Raymond
INVENTOR
Henry Breer
by Pollock, Laass & Wing
his Attys

UNITED STATES PATENT OFFICE.

HENRY BREER, OF DE WITT, NEW YORK, ASSIGNOR TO CAROLINE H. BREER, OF SAME PLACE.

APPARATUS FOR DESICCATING FERTILIZERS.

SPECIFICATION forming part of Letters Patent No. 303,914, dated August 19, 1884.

Application filed March 25, 1884. (No model.)

*To all whom it may concern:*

Be it known that I, HENRY BREER, of De Witt, in the county of Onondaga, in the State of New York, have invented new and useful Improvements in Desiccating Apparatus, of which the following, taken in connection with the accompanying drawings, is a full, clear, and exact description.

This invention relates to the class of desiccating apparatus designed for treating animal matter for fertilizers, and is designed as a further improvement on analogous devices covered by several Letters Patent of the United States already obtained by me.

The object of my present invention is to employ in a more effectual manner steam-heat for desiccating the substance under treatment, all as hereinafter more fully explained, and specifically set forth in the claims.

In the annexed drawings, Figure I is a longitudinal section of my improved desiccating apparatus. Fig. II is a vertical transverse section on line X X, Fig. I; and Fig. III is a rear end view of the apparatus.

Similar letters of reference indicate corresponding parts.

A represents the furnace or fire-box of the apparatus. C is an elongated combustion-chamber communicating with the aforesaid furnace A, and having extended longitudinally through it a horizontal rotary cylinder, D, which is open at opposite ends, and communicates at one end with the aforesaid combustion-chamber, and at the opposite end with the smoke-stack E, said cylinder being journaled in suitable bearings supported on the end walls of the apparatus, the journals being in the form of hollow trunnions projecting from spiders S, to which the cylinder D is secured. Around the exterior of the cylinder, and connected steam-tight therewith, I arrange a steam-jacket, $a$, into which I admit steam by means of steam-pipe $c$, extended through the hollow trunnion $b$, at one end of the cylinder, and intersecting radial pipes $c'$, inside of the cylinder, which radial pipes are extended through the shell of the cylinder, and communicate with the steam-jacket $a$, a stop-cock, $m$, being applied to the steam-pipe $c$ for controlling the ingress of steam. Similar pipes, $c$ and $c'$, are connected to the opposite end of the cylinder, and extend through the hollow trunnion $b$ thereof, to emit the water of condensation, said water being conducted to the ends of the latter radial pipe $c'$ by means of a spiral partition, $d$, which, in the rotation of the cylinder, scoops the water of condensation from the lower portion of the steam-jacket and carries it around the same to a proper elevation, to allow said water to enter and escape through the aforesaid pipes. The substance to be treated is introduced through a door, H, at the top of the front end of the apparatus, as shown in Fig. I of the drawings, and in the rotation of the cylinder D the aforesaid substance is carried toward the opposite end of the cylinder, where a door, I, is provided for the discharge of the dried substance. In order to obtain control of the movement of the aforesaid substance through the cylinder D, I connect to the inner surface thereof a series of scraper-plates, $e$, distributed through the length of the cylinder, as shown in Fig. I of the drawings, which plates are pivoted at one end and connected at the opposite end to a rod, $f$, which is extended to the end of the cylinder, so as to allow the attendant of the apparatus to shift the plates $e$ in their position by means of the aforesaid rod $f$. By a greater or less angle of inclination of the plates $e$ the substance under treatment is propelled with greater or less rapidity from end to end of the cylinder.

Having described my improvements, what I claim is—

1. In combination with the combustion-chamber C and horizontal rotary cylinder D, arranged to receive from it the products of combustion, the steam-jacket $a$, surrounding the cylinder, substantially as set forth and shown.

2. The rotary cylinder D, provided with the steam-jacket $a$, hollow trunnions $b$, and steam-pipes $c$ $c'$, communicating with the steam-jacket, as shown, in combination with the combustion-chamber C, inclosing said cylinder, and communicating with the interior thereof, substantially as described and shown.

3. In combination with the rotary cylinder D, steam-pipes $c\ c'$, and steam-jacket $a$, the spiral partition $d$, substantially as described and shown, for the purposes set forth.

In testimony whereof I have hereunto signed my name and affixed my seal, in the presence of two attesting witnesses, at Syracuse, in the county of Onondaga, in the State of New York, this 28th day of February, 1884.

HENRY BREER. [L. S.]

Witnesses:
 C. H. DUELL,
 WM. C. RAYMOND.